US007272379B1

(12) United States Patent
Tang et al.

(10) Patent No.: US 7,272,379 B1
(45) Date of Patent: Sep. 18, 2007

(54) SESSION-BASED ACCOUNTING

(75) Inventors: Jack T. Tang, Danville, CA (US); Russel Brankley, Willingboro, NJ (US); Daniel T. Belenets, Summit, NJ (US); Ce Xu, San Ramon, CA (US); William C. King, Lafayette, CA (US); Peter Hu, Pleasanton, CA (US); Patricia R. Chang, San Ramon, CA (US); Peter Li, Albany, CA (US)

(73) Assignee: Cellco Partnership, Bedminster, NJ (US)

( * ) Notice: Subject to any disclaimer, the term of this patent is extended or adjusted under 35 U.S.C. 154(b) by 1005 days.

(21) Appl. No.: 10/133,232

(22) Filed: Apr. 26, 2002

(51) Int. Cl.
 *H04M 11/00* (2006.01)
(52) U.S. Cl. ...................... 455/406; 455/405
(58) Field of Classification Search ............... 455/405, 455/406, 407, 408; 379/111, 112.01, 114.03, 379/114.23, 114.24, 114.25, 114.06, 114.04, 379/121.01, 126, 128, 133
See application file for complete search history.

(56) References Cited

U.S. PATENT DOCUMENTS

| | | | |
|---|---|---|---|
| 5,003,584 A * | 3/1991 | Benyacar et al. ............ 379/119 |
| 5,359,182 A | 10/1994 | Schilling |
| 5,790,548 A | 8/1998 | Sistanizadeh et al. |
| 5,826,185 A | 10/1998 | Wise et al. |
| 6,029,062 A | 2/2000 | Hanson |
| 6,036,090 A | 3/2000 | Rahman et al. |
| 6,058,300 A | 5/2000 | Hanson |
| 6,075,783 A | 6/2000 | Voit |
| 6,104,711 A | 8/2000 | Voit |
| 6,149,353 A | 11/2000 | Nilsson |
| 6,185,198 B1 | 2/2001 | LaDue |
| 6,185,414 B1 | 2/2001 | Brunner et al. |
| 6,236,851 B1 | 5/2001 | Fougnies et al. |
| 6,298,250 B1 | 10/2001 | Nilsson |
| 6,330,443 B1 | 12/2001 | Kirby |
| 6,434,378 B1 | 8/2002 | Fougnies |
| 6,453,158 B2 | 9/2002 | Donovan et al. |
| 6,473,610 B1 | 10/2002 | Nilsson |
| 6,487,401 B2 | 11/2002 | Suryanarayana et al. |
| 6,496,690 B1 | 12/2002 | Cobo et al. |
| 6,741,687 B1 | 5/2004 | Coppage |
| 6,829,473 B2 | 12/2004 | Raman et al. |
| 2001/0014085 A1 | 8/2001 | Johansson et al. |

(Continued)

OTHER PUBLICATIONS

R. Bhalla, "'Push' Services Enabled Packet Data Network," *Cisco Confidential*, Mar. 6, 2001, pp. 1-9.

(Continued)

*Primary Examiner*—Duc M. Nguyen
*Assistant Examiner*—Wayne Cai
(74) *Attorney, Agent, or Firm*—McDermott Will & Emery LLP

(57) ABSTRACT

Improved billing accuracy in session-based communications is provided by separating session (or connection) billing from session processing. If two sessions (440, 442) on the same serving node are bridged, so the true stop time of the prior session (440) is not known, the stop time of the prior session is defined as a function of the last activity during (TALS1) that session. To accomplish this, the serving node detects and stores the time of last activity and the time of initiation for each connection and determines the billing time accordingly, regardless of the state of the inactivity timer (430) or whether sessions were bridged by the serving node.

17 Claims, 6 Drawing Sheets

U.S. PATENT DOCUMENTS

2003/0149772 A1* 8/2003 Hsu et al. .................. 709/227
2004/0028055 A1 2/2004 Madour et al.

OTHER PUBLICATIONS

"SMS Subparameters Enhancement," *KDDI*, C14-20010327-xxx, pp. 1-6.

"Wireless IP Network Standard," 3rd Generation Partnership Project 2 "3Gpp2", Version 1.0, Jul. 17, 2001, pp. 1-134.

U.S. Appl. No. 11/138,343, filed May 27, 2005, Determining Chargeable Duration at the Home Agent for a Prepaid MIP Session.

U.S. Appl. No. 10/247,034, filed Sep. 19, 2002, Method and System for Processing Prepaid Wireless Data Communications.

\* cited by examiner

| Item | Parameter | Type/Vendor Type | Maximum Payload Length | RADIUS Attribute Definitions Format | RADIUS Attribute Definitions Field | Special Values |
|---|---|---|---|---|---|---|
| A. Mobile Identifiers 302 | | | | | | |
| A1 | MSID | 31 | 15 | string | Calling_ID | |
| B. User Identifiers 304 | | | | | | |
| B1 | IP Address | 8 | 4 | ip-addr | Framed IP Address | |
| B2 | Network Access Identifier (NAI) | 1 | 64 | string | User-Name | |
| C. Session Identifiers 306 | | | | | | |
| C1 | Account Session ID | 44 | 8 | string | Acct_Session_Id | ASCII string of session ID |
| C2 | Correlation ID | 26/44 | 8 | string | Correlation_Id | ASCII string of correlation ID |
| C3 | Session Continue | 26/48 | 4 | integer | 3GPP2_Session_cont | 0=False, 1=True |
| D. Infrastructure Identifiers 308 | | | | | | |
| D1 | MIP Home Agent (HA) | 26/7 | 4 | ip-addr | 3GPP2_HA_IP_Addr | |
| D2 | PDSN/FA Address | 4 | 4 | ip-addr | NAS Address | |
| D3 | Serving PCF | 26/9 | 4 | ip-addr | 3GPP2_PCF_IP_Addr | |
| D4 | BSID | 26/10 | 12 | string | 3GPP2_BSID | A number formed from the concatenation of SID+ NID+ BSC ID, where each item is encoded using four hexadecimal upper case ASCII characters. |
| E. Zone Identifiers 310 | | | | | | |
| E1 | User Zone | 26/11 | 4 | integer | 3GPP2_User_ID | Least significant 16 bits hold user zone ID (UZ_ID) next significant 15 bits hold user zone system ID (UZ_SID) and most significant bit always zero. UZ_ID and UZ_SID are defined in IS-638-B. |
| F. Session Status 312 | | | | | | |
| F1 | Forward Mux Option | 26/12 | 4 | integer | 3GPP2_FMUX | |
| F2 | Reverse Mux Option | 26/13 | 4 | integer | 3GPP2_RMUX | |
| F5 | Service Option | 26/16 | 4 | integer | 3GPP2_SO | |
| F6 | Forward Traffic Type | 26/17 | 4 | integer | 3GPP2_FTYPE | 0=Primary, 1=Secondary |
| F7 | Reverse Traffic Type(Primary, Secondary) | 26/18 | 4 | integer | 3GPP2_RTYPE | 0=Primary, 1=Secondary |

| | | | | | |
|---|---|---|---|---|---|
| F8 | Fundamental Frame Size | 26/19 | 4 | integer | 3GPP2_FSIZE | 0=no fundamental, 1=5ms frame, 2=20ms frame |
| F9 | Forward Fundamental RC | 26/20 | 4 | integer | 3GPP2_FRC | |
| F10 | Reverse Fundamental RC | 26/21 | 4 | integer | 3GPP2_RRC | |
| F11 | IP Technology | 26/22 | 4 | integer | 3GPP2_IP_Tech | 1=Simple IP, 2=Mobile IP |
| F12 | Compulsory Tunnel Indicator | 26/23 | 4 | integer | 3GPP2_Comp_Flag | 0=no tunnel |
| | | | | | | 1=non-secure tunnel |
| | | | | | | 2=secure tunnel |
| F13 | Release Indicator | 26/24 | 4 | integer | 3GPP2_Reason_Ind | Reasons for stop record: |
| | | | | | | 0=unknown |
| | | | | | | 1=PPP/Service timeout |
| | | | | | | 2=Handoff |
| | | | | | | 3=PPP termination |
| | | | | | | 4=Mobile IP registration failure |
| | | | | | | 5=Make billing adjustment |
| F14 | DCCH Frame Format (0/5/20ms) | 26/50 | 4 | integer | 3GPP2_F_Size | Frame Sizes: |
| | | | | | | 0/5/20ms |
| | | | | | | |
| G. Session Activity 314 | | | | | | |
| G1 | Data Octet Count (Terminating) | 43 | 4 | integer | Acct_Output_Octets | |
| G2 | Data Octet Count (Originating) | 42 | 4 | integer | Acct_Input_Octets | |
| G3 | Bad PPP Frame Count | 26/25 | 4 | integer | 3GPP2_Bad_Frame_Count | |
| G4 | Event Time | 55 | 4 | time | 3GPP2_Event_Timestamp | See of IS-835 Standard |
| G8 | Active Time | 26/49 | 4 | integer | 3GPP2_Active_Time | |
| G9 | Number of Active Transitions | 26/30 | 4 | integer | 3GPP2_Num_Active | |
| G10 | SDB Octet Count (Terminating) | 26/31 | 4 | integer | 3GPP2_SDB_Input_Octets | |
| G11 | SDB Octet Count (Originating) | 26/32 | 4 | integer | 3GPP2_SDB_Output_Octets | |
| G12 | Number of SDBs (Terminating) | 26/33 | 4 | integer | 3GPP2_NumSDB_Input | |
| G13 | Number of SDBs (Originating) | 26/34 | 4 | integer | 3GPP2_NumSDB_Output | |
| G14 | Number of HDLC layer bytes received | 26/43 | 4 | integer | 3GPP2_Num_Bytes_Received_Total | The count of all bytes received in the reverse direction by the HDLC layer in the PDSN. |
| G15 | In-Bound Mobile IP Signaling Octet Count | 26/46 | 4 | integer | 3GPP2_Mobile_IP_Signaling_In-Bound_Count | This is the total number of octets in registration requests and solicitations sent by the mobile. |

| | | | | | |
|---|---|---|---|---|---|
| G16 | Outbound Mobile IP Signaling Octet Count | 26/47 | 4 | Integer | 3GPP2_Mobile_IP_Signaling_Out-Bound_Count | This is the total number of octets in registration replies and agent advertisements, sent to the mobile. |
| G17 | Last User Activity Time | 26/TBD | 4 | time | 3GPP2_Last_Activity_Timestamp | |
| I. Quality of Service 316 | | | | | | |
| I1 | IP Quality of Service (QOS) | 26/36 | 4 | integer | 3GPP2_IP_QOS | 0=Best Effort |
| | | | | | | 10=AF11 |
| | | | | | | 12=AF12 |
| | | | | | | 14=AF13 |
| | | | | | | 18=AF21 |
| | | | | | | 20=AF22 |
| | | | | | | 22=AF23 |
| | | | | | | 26=AF31 |
| | | | | | | 28=AF32 |
| | | | | | | 30=AF33 |
| | | | | | | 34=AF41 |
| | | | | | | 36=AF42 |
| | | | | | | 38=AF43 |
| | | | | | | 46=EF |
| I4 | Airlink Quality of Service (QOS) | 26/39 | 4 | integer | 3GPP2_Air_QOS | Least significant 4 bits hold the QoS priority as defined in C.S0001-A in the subscriber profile. |
| Y. Airlink Record Specific Parameters 318 | | | | | | |
| Y1 | Airlink Record Type | 26/40 | 4 | integer | 3GPP2_Airlink_Record_Type | 1=Connection Setup |
| | | | | | | 2=Active Start |
| | | | | | | 3=Active Stop |
| | | | | | | 4=SDB Record |
| Y2 | R-P Session ID | 26/41 | 4 | integer | 3GPP2_R-P_Session_ID | |
| Y3 | Airlink Sequence Number | 26/42 | 4 | Integer | 3GPP2_Airlink_Sequence_Number | |
| Y4 | Mobile Originated / Mobile Terminated Indicator | 26/45 | 4 | Integer | 3GPP2_Mobile_Terminated_Originated_Indicator | 0=Mobile Originated |
| | | | | | | 1=Mobile Terminated |
| Z. Container 320 | | | | | | |
| Z1 | Container | 26/6 | Variable | string | 3GPP2_Container | See Annex C of IS-835 Standard |

*FIG. 3C*

SESSION-BASED ACCOUNTING

FIELD OF THE INVENTION

The inventive concepts relate to techniques for accurately accounting and billing for session based packet data communication over one or more networks, for example for a mobile wireless terminal device.

BACKGROUND

Digital data communication is fast becoming a ubiquitous aspect of modern life. The increasing development of technology has advanced dissemination of information through telecommunication. The Internet, as well as private local area and wide area data networks, enable transfer of large volumes of data at ever increasing speed and reliability. The Internet is now being used for interactive communication as well as for its original objective of information access.

Concurrent with the explosion in demand for data services, there has been an ever-increasing demand for mobile communications. The number of cellular telephone customers, for example, has grown exponentially. As part of the technical development of the networks to meet the demand for mobile communications, carriers have migrated from an analog-based technology to several digital transport technologies, wherein digital data is "packetized" and transmitted across digital networks. Newer versions of digital wireless communication networks, or mobile packet switched data networks, support a variety of data communication services that are intended to extend the common data communication capabilities of the wired domain to the wireless mobile domain. The current trend is toward the Third Generation of Wireless Telephony (3G) networks (e.g., 3G-1x networks). The 3RD Generation Partnership Project 2 (3GPP2) standard entitled Wireless IP Network Standard, 3GPP2 P.S0001-A, Version 3.0.0, ©3GPP2, version date Jul. 16, 2001 (the "3GPP2 Standard", a.k.a. the IS-835 Standard") codifies the use of mobile IP in a 3G-1x packet data network, also referred to as a code division multiple access (CDMA) or CMDA2000-1x packet data network.

To communicate via a packet switched data network, each device must have a packet protocol address. In common forms of data networks the address is an Internet Protocol (IP) address. Most often, data is transferred using Transmission Control Protocol/Internet Protocol (TCP/IP). With current versions of IP, the IP addresses are a scarce commodity, typically administered and assigned through an Internet service provider (ISP).

To send a data packet (i.e., packetized digital data) over an IP packet network, the source device must know its own address plus the address of the destination device. It is possible to assign the address when the user's device first logs-in, or when the user requests data after an idle time, assuming the user's device initiates a new connection after power-up or re-connection after time-out. Generally, when a device sends a request for data to a server, the server obtains the currently assigned IP address from a request packet sent by the device, hence the server can properly address one or more response packet(s) to the requesting device, whether that device is a fixed (i.e., line connected) device or mobile (i.e., wireless) station.

The addresses can be reassigned when the terminal goes off-line or remains idle for some extended period. In the wireless domain, the IP addresses are assigned and reassigned by a network element. For example, after establishment of a point-to-point protocol (PPP) connection between the mobile station and a packet data serving node (PDSN) in the network, an IP address can be assigned by the PDSN. With this approach, addresses are stored in a database of the PDSN. Alternatively, an external Dynamic Handshake Challenge Protocol (DHCP) server or a home agent (HA) server can assign the IP address to the mobile station. There are two somewhat different versions of IP management techniques and services being deployed for mobile station subscribers, Simple IP (SIP) and Mobile IP (MIP). These IP address services are discussed, for example, in the IS-835 Standard.

SIP is a service in which the user is assigned a dynamic IP address from the serving PDSN. A service provider network (e.g., a radio network (RN)) provides the user's mobile station with IP routing service. The user's mobile station retains its IP address as long as that it is served by the RN, which has connectivity to the PDSN that assigned the IP address to mobile station. With the SIP, there is no IP address mobility beyond that PDSN, and as a result, there is no handoff between PDSNs.

MIP is a service in which the user is provided IP routing service to a public IP network and/or secure IP routing service to predefined private IP networks. A mobile station is able to use either a non-zero static IP address or a dynamically assigned IP address belonging to its home IP network HA. The zero HA address for an mobile station indicates that a dynamic HA allocation is required for the mobile station. If the mobile station requests a dynamic HA, then the mobile station should also request a dynamically assigned home address along with dynamic HA allocation. The mobile station is able to maintain a persistent IP address even when handing off between radio networks connected to separate PDSNs. A network (including a HA) may be any of a variety of known networks, such as a home IP network, private network, home access provider network (e.g., a IMT-2000 cellular network), or publicly accessible ISP network.

A remote authentication dial-in user service (RADIUS) is also included in the network and interfaces with the PDSN and IP network to perform accounting for a user's sessions. To aid in the accounting process, a PDSN is configured to support a PPP network session inactivity timer for each PPP session, which is typically set at 10 minutes in the prior art, but other settings may also be used. At present, there are many situations under which a PDSN user exits a call or loses radio coverage and, consequently, loses the packet session connection context. In such a case, that user could re-initiate another packet data call. If the re-initiated call is placed after expiration of the network session inactivity timer, each call is billed individually. That is, billing is accomplished by subtracting the start time from the disconnect time for each session.

Unfortunately, a problem occurs when the user re-initiates a new packet data call before the network session inactivity timer expires, i.e., prior to 10 minutes, in our example. In such a case, the two sessions can be viewed by the system as one continuous session having a start time corresponding to initiation of the first session and a stop time corresponding to termination of the second session, regardless of the downtime between sessions. The current IS-835 Standard provides that the packet session time, used in accounting, is determined based on the start time and stop time of a packet data session, which are stored according to the 3GPP2 Protocol. The disadvantage is that the user is billed incorrectly for the time between exiting the first PPP session and successfully getting a new second PPP session connection, as the first PPP session and second PPP session are treated as one overall PPP session. As a result, the user can be charged for the time that the user is not using the packet data service, and wireless operators could be accused of overcharging the user in such situations. To avoid this, most operators adjust the billable time by subtracting the maximum of the timer value (i.e., 10 minutes), since there is no method to determine or adequately approximate with finer granularity when the user has exited from the first session or when the radio coverage has been lost. The cumulative effect of such adjustments could cause substantial loss of revenue. If the operators do not make such adjustments, users get over-billed and that could cause a tremendous loss of user's trust.

To date, there is an ambiguity in billing the user when a plurality of sessions are viewed by the network as a single session. Hence, there is a continuing need for effective techniques to perform more accurate accounting for packet data communication service utilized by mobile wireless terminal equipment.

SUMMARY OF THE INVENTION

The inventive concepts alleviate the above noted problems in accurately accounting for and billing a user for use of a device in a digital network. In typical digital data networks, a user may be erroneously billed for usage of the device when the time elapsed between a plurality of sessions is less than the predetermined duration of a session inactivity timer included in the node or system that collects or manages billing information. Since the inactivity timer provides real session management benefits, it is preferable to maintain the inactivity timer having some realistic duration setting. Therefore, the inactivity timer may be maintained, while significantly improving billing accuracy of a user when, for example, a plurality of sessions are viewed by the network as a single session.

The techniques disclosed herein can be implemented with any session-based billing system, such as those systems typically implemented for wired or wireless devices, such as cellular telephones, pagers, personal digital assistants (PDAs), e-mail devices, Internet enabled devices, Web enabled devices or some combination thereof, as examples. As a broad class, these types of devices and similar devices are collectively referred to herein as "mobile stations". As will be appreciated by those skilled in the art, a mobile station may be linked to service providers, content providers, serving nodes, accounting systems, and other mobile stations by any of a variety of wired or wireless communication and network means, or any combination thereof, such as land lines, satellite links, fiber links, telephone networks, the Internet, intranets, extranets, wide and local area networks, virtual private networks, the World Wide Web (the "Web"), and so forth.

In accordance with the present techniques, prior art billing problems are overcome by separating session (or connection) processing from billing processing. That is, even if two sessions on the same serving node (e.g., a PDSN) get bridged, the stop or termination time of the prior session is defined as a function of the last activity of that session, to allow for more accurate usage time adjustments and, therefore, more accurate billing. In the embodiments, this is true even if the same IP address is assigned to the user's device for the subsequent session. Therefore, regardless of how the serving node treats two or more connections for communication purposes, from a billing perspective each connection is treated as separate for billing. To accomplish this, the serving node detects and stores the time of last activity and the time of initiation for each connection, regardless of the state of the inactivity timer or whether sessions were bridged by the serving node.

In the context of typical digital data communication protocols (e.g., the 3GPP2 Protocol), the last activity stop time of a prior session is used as a termination time of that prior session for billing. In the 3GPP2 protocol, a new attribute is included for storage of the last activity stop time by the serving node. Additionally, a new value for the existing attribute F13 is defined, wherein the new value represents the existence of an event that requires a billing adjustment. These two new structures are introduced specifically to do billing adjustment and to improve the accuracy and integrity of the session time upon which the billing is based. Without this new parameter, the operator or carrier has to subtract the predetermined value of the session inactivity timer, which results in revenue loss for the carrier. The techniques disclosed herein will help to recover some of the revenue lost and at the same preserve the trust of subscribers.

Additional objects, advantages and novel features will be set forth in part in the description which follows, and in part will become apparent to those skilled in the art upon examination of the following and the accompanying drawings or may be learned by practice of the inventive concepts or the specific embodiments. The objects and advantages may be realized and attained by means of the instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

FIGS. 3A-3C is a table of parameters for a modified 3GPP2 protocol, in accordance with the present invention.

DETAILED DESCRIPTION OF THE PREFERRED EMBODIMENTS

Figure 1:
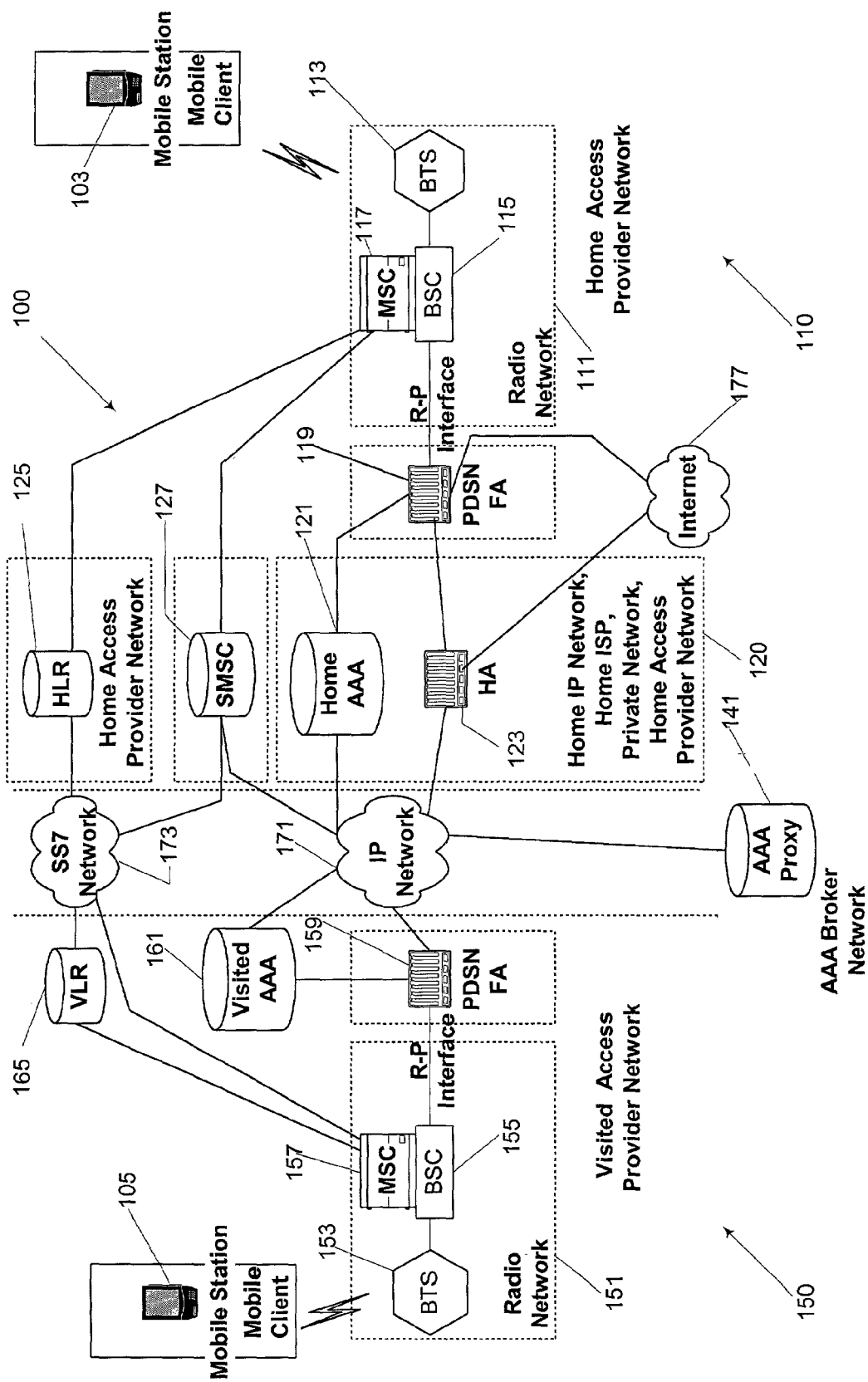
FIG. 1 is a block diagram of a wireless communication network.

The various aspects of invention disclosed herein relate to techniques for providing improved accounting and billing services for digital data devices and to various equipment useful in implementing those techniques. The inventive concepts alleviate the problems of inaccurately accounting for and billing a user for use of a device in a digital network. In typical digital data networks, a user may be erroneously billed for usage of the device when the time elapsed between a plurality of sessions is less than the predetermined duration of a session inactivity timer included in the node or system that collects or manages billing information. Since the inactivity timer provides real session management benefits, it is preferable to maintain the inactivity timer having some realist duration setting in a session-based system. Therefore, the inactivity timer may be maintained, while significantly improving the billing accuracy of a user when, for example, a plurality of sessions are viewed by the network as a single session.

The inventive concepts can be implemented with any session-based billing system, such as those systems typically implemented for wired or wireless devices. Such devices include cellular telephones, pagers, personal digital assistants (PDAs), e-mail devices, Internet enabled devices, Web enabled devices or some combination thereof, as examples. As will be appreciated by those skilled in the art, a mobile station may be linked to service providers, content providers, serving nodes, accounting systems, and other mobile stations by any of a variety of wired or wireless communication and network means, or any combination thereof, such as land lines, satellite links, fiber links, telephone networks, the Internet, intranets, extranets, wide or local area networks virtual private networks, the World Wide Web (the "Web"), and so forth.

In the preferred form, the inventive concepts are applicable to a variety of different wireless networks supporting packet data communications services, such as GSM/GPRS, UMTS, etc., as may be implemented in a variety of different frequency bands. A logical evolution of IS-95A standard types of digital wireless communications, toward a third generation (3G) implementation, involves an upgrade of the digital technology toward CDMA2000-1x or 1x. The attendant 1x Radio Transmission Technology (1xRTT) may use a 1.25 MHz CDMA bandwidth to form a 1xRTT CDMA network implementation. Although there are many benefits associated with such 1x systems, the two most significant benefits are voice capacity increase and high-speed packet data. Studies and simulations have shown that voice capacity increase is between 1.5 to 2 fold over IS-95A and that data can burst at a raw speed of 153.6 Kb/s with a throughput of 144 Kb/s in the initial release.

A 1xRTT CDMA network implementation provides the ability for mobile professionals with their laptop PCs, Pocket PCs, Palm, and other wireless devices to access the Internet, their email, or corporate intranets in a wireless environment at higher data rates with broader coverage for a richer experience. It enables faster access, richer browser experience with graphics and images, and increased speed and mobility for laptops and PDAs. 1x can support vertical applications, such as telemetry, transactions processing, and database access. Hence, the preferred embodiments provide the inventive accounting and billing capabilities in a 1x system, such as a 1xRTT system operating in the 1.25 MHz band. To appreciate applicability of the billing techniques to such a network, it may be helpful first to consider the typical architecture of such a network and the operation thereof, particularly as it relates to providing packet data communication sources.

FIG. 1 is a block diagram of a representative 1xRTT CDMA network 100, within which the present invention can be implemented. Network 100 may comprise access networks operated by a large number of separate and independent service providers. For discussion purposes, the drawing shows two such access networks 110 and 150. Through the providers' access networks, the overall network 100 offers mobile communications to customers using mobile stations throughout a wide geographic area. Different customers subscribe to service through different providers and are assigned to specific radio networks (RNs) 111 or 151 as their home networks within access networks 110 or 150; the mobile stations and network elements are provisioned accordingly. Although the illustrated network 100 will provide services for many customers through their mobile stations, for discussion purposes, the drawing shows only two such mobile stations, i.e., MS 103 and MS 105, and those two mobile stations are assumed to belong to customers of the access provider network 110. As shown, MS 103 is operating within the service area of its home access provider network 110. By contrast, the customer using the MS 105 has roamed out of the service area of its home access provider network 110 and into a different geographic area where MS 105 is receiving wireless service from a different access provider network 150, referred to as the "visited" access provider network.

As previously mentioned, MS 103 and MS 105 may take one or more of several forms. For example, a MS may be an enhanced mobile telephone station with a display and user input capabilities to support certain text and image communications, for example, for e-mail and web surfing applications. Another mobile station may comprise a PDA with built-in wireless communication capabilities, such as shown with MS 103 and MS 105 in FIG. 1. As another alternative, a mobile station may comprise a wireless device such as a mobile telephone having data communication capabilities that may be connected to a portable computing device such as a laptop computer. Network 100 supports both Simple IP (SIP) and Mobile IP (MIP) types of address management services for mobile customers that subscribe to the packet data communications. It may be helpful to summarize these IP address functions of the network 100.

Simple IP (SIP) is a service in which the user is assigned a dynamic IP address from a serving PDSN. A service provider network, such as networks 110 or 150, provides the user's mobile station (e.g., MS 103 or MS 105) with IP routing service. The user retains its IP address as long as it is served by a radio network (e.g., RN 111) that has connectivity to the PDSN (e.g., PDSN 119) that assigned the IP address to the user's mobile station. There is no IP address mobility beyond this PDSN, and as a result, there is no handoff between PDSNs.

Mobile IP (MIP) is a service in which the subscriber is assigned an IP address from a "home" network (e.g., home agent (HA) 123 of network 110). With MIP service, the assigned IP address does not change as the mobile station changes it's point of attachment to the network 100 (e.g. by roaming to a new provider network, or by roaming across a PDSN boundary within a single provider's network). If dynamically assigned, the IP address remains assigned to the particular mobile station until that station logs-off, is inactive for longer than some set period, or the data session is otherwise terminated. Therefore, with respect to FIG. 1, with MIP MS 105 maintains its IP address when roaming from network 110 to network 150.

In FIG. 1, the elements of RN 111 of the home access provider's network 110, include MS 103 and MS 105, the base stations represented for example by the one base transceiver system (BTS) 113, and the base station controller (BSC) 115. A typical access provider network 110 includes a number of such RNs, although only one is shown for discussion purposes. Each RN serves as the "home" network for some mobile stations (e.g., MS 103) and provides roaming service for mobile stations (not shown) of customers that visit the geographic area served by the RN.

Each mobile station constitutes an interface between the mobile subscriber (or user) and the base station. Besides voice communications, the mobile station provides control and signaling functions. The mobile station is able to tune, under system command, to a logical channel in the frequency spectrum allocated to the system. Each logical channel comprises a pair of channels for two-way conversation. Power levels of the transmitter can also be controlled by the system.

BTS 113 is the part of RN 111 that sends and receives RF signals to/from the mobile stations (e.g., MS 103) it currently serves. BTS 113 contains the antenna systems, towers, transmitters, and receivers at a site. BTS 113 is responsible for the control, monitoring, and supervision of calls made to and from each mobile station within its serving area. BTS 113 assigns and reassigns channels to the mobile stations and monitors the signal levels to recommend hand-offs to other BTSs (not shown).

BSC 115 is a centralized processor that controls the functions of a number of the BTSs (e.g., BTS 113) and helps to manage how calls made by each mobile station are transferred (or "handed-off") from one serving BTS to another. Each wireless network equipment vender implements this function differently. Some vendors have a physical entity, which they call a BSC, while other vendors include this functionality as part of their mobile switching center (MSC). For convenience of illustration, BSC 115 is shown associated with or incorporated into MSC 117.

The network 110 also includes a packet data serving node (PDSN) 119, which is a fixed network element introduced in the architecture for 3G networks to support packet data services. The interface between one or more of the CDMA2000-1x radio networks and a PDSN is called a R-P Interface. In the preferred embodiment, PDSN 119 supports Simple IP and Mobile IP addressing. PDSN 119 establishes, maintains and terminates logical links to the associated radio network, in this case RN 111, across the R-P interface. PDSN 119 also supports PPP sessions with mobile stations, such as MS 103.

PDSN 119 initiates Authentication, Authorization and Accounting (AAA) communications for the mobile station client to a home AAA server 121. Home AAA server 121 is also referred to as a remote authentication dial-in user service (RADIUS) server. PDSN 119 receives service parameters for MS 103, as a mobile client, from the AAA server 121. PDSN 119 also collects usage data for accounting purposes, which it relays to AAA server 121. PDSN 119 also is the network element that routes packets to/from external packet data networks, for example through a network service provider 123 to and from the Internet. Network service provider 123 may be an Internet Service Provider (ISP), in this case for the home service of MS 103. Alternatively, the network shown at 123 may coincide with or connect to a private data network or "Intranet" to which the particular customer has secure access. Although shown as a separate link for convenience, the PDSN 119 typically communicates with the AAA server 121 and with the ISP network 123 via a private IP network, such as the network 171.

The "visited" access provider network 150 includes physical radio networks, such as RN 151 of FIG. 1. RN 151 comprises at least one BTS 153 and BSC 155 for wireless communications with mobile stations, which are substantially the same in the illustrative embodiment as BTS 113 and BSC 117 of RN 111. RN 151 also includes a MSC-157, which is similar to MSC 117 in RN 111. RN 151 serves as the "home" network for some mobile stations (not shown) and provides roaming service for customers that visit the geographic area served by the access provides network 150, such as MS 105.

The access provider network 150 also includes a PDSN 159 and an AAA server 161, similar to those in network 110. For stations "homed" on RN 151, PDSN 159 acts as a home agent (HA) for packet service, and PDSN 159 interacts with an AAA server 161 in a manner analogous to that described above with regard to PDSN 119 and AAA server 121. However, for the roaming MS 105, PDSN 159 acts as a foreign agent (FA), and server 161 acts as a visited AAA server.

AAA servers are used for authentication, authorization and accounting functions for packet data calls in a CDMA2000-1X network. Both access provider networks 110 and 150 include one or more of such AAA servers (i.e., servers 121 and 161, respectively) and there may be one or more third party trusted AAA servers 141 that serve as proxies for communications between AAA servers of different access providers. The AAA servers provide authentication for both Simple IP and Mobile IP. These servers authorize service subscriptions, service profiles, and customized services. These servers also perform a variety of accounting functions, including starting an accounting record, maintaining an interim accounting record, and stopping an accounting record for a packet data communication service.

In the preferred implementation of the network 100, all authentication, authorization and accounting transactions are performed using a RADIUS protocol of the IS-835 standard. The RADIUS protocol has been in use for many years and is used widely in ISP networks. In the access provider network 110, RADIUS is implemented only as client-server in which PDSN 119 acts as the client and AAA 121 as the server. Similarly, in the access provider network 150, RADIUS is implemented only as client-server in which the PDSN 159 acts as the client and AAA 161 as the server.

During registration of roaming subscribers, it becomes necessary to conduct certain transactions between AAA servers 121 and 161. These communications may be conducted directly via the IP network 171 or the like. In many cases, however, the AAA server 121 or 161 in each respective network 110 or 150 will communicate via the IP network 171 with the secure broker server 141 acting as a AAA proxy server. The IP network 171 could be a public network, such as a portion of the public Internet. However, because of the mission-critical nature of the AAA communications and the security and finance-related issues involved in such communications, the IP network 171 preferably is a secure packet communication network operated by one or more carriers or their trusted service providers.

The mobile stations are provisioned to normally operate in the serving area of one wireless system operated by the user's access service provider, and this radio system is referred to as the "home" location or system. In our example, RN 111 within the access provider network 110 is provisioned as the "home" system for both of the exemplary mobile stations 103 and 105. Within the access provider network 110 providing the "home" service for MS 103 and MS 105 is a Home Location Register (HLR) 125 that stores subscriber packet data subscription service options and terminal capabilities, i.e., regarding subscription to CDMA2000-1x, IS-95, voice, packet data, dual mode, dual service voice and packet data. The home RN 111 uses the service information from the HLR 125 to provide the subscribed services to each user's mobile station, for example while the MS 103 is operating in the service area of the home RN 111. Although not shown, the access provider network 150 typically may include one or more additional servers for storing similar HLR service information for mobile stations homed to radio networks, such as RN 151, of that access network 150. All radio networks of one access provider network may utilize one server for the HLR function.

As shown, the customer using MS 105 has roamed into the service area of the visited access provider network 150. For MS 105, service information is downloaded from the HLR 125 to the Visitor Location Register (VLR) 165 in visited access network 150 during a successful registration process. Specifically, the visited wireless communication network 150 assigns a register in server 165, as a VLR, to a mobile station, in this case MS 105, during a period when the mobile station roams into the wireless serving area of the network 150 and remains registered on that visited system. By doing so, proper services to roaming MS 105 are provided.

VLR 165 communicates with HLR 125 to authenticate MS 105 and to obtain a copy of MS 105's subscriber subscription service information, including packet data service information, from the HLR during the registration process. Typically, this is accomplished by packet message exchange via a SS7 interoffice signaling network 173. This communication is analogous to roaming registration authentication conducted today in both analog and digital cellular communication networks, although the communication here includes the extra information relating to the subscriber's packet data service.

Subsequently, when the subscriber using MS 105 initiates a packet data session, BSC 155 first goes to VLR 165 via the MSC 157 to check subscriber subscription information prior to granting the service to the subscriber. If the mobile station is not yet registered, this would initiate the registration procedure. However, if registration has been completed when the subscriber attempts the packet data communication, VLR 165 will provide the requisite authorization based on checking the downloaded subscriber subscription information, and then allow communications to go to PDSN 159 for further processing specifically related to the data services. Although not shown, network 110 typically includes a similar VLR functionality.

The home access provider network 110 also includes a short message service center (SMSC) 127. The SMSC receives messages, such as e-mail, intended for transmission to mobile stations and forwards them to the appropriate MSC 117 or 157. The SMSC 127 receives the messages over an IP network, such as network 171 or the Internet. The links to the MSCs typically go through an SS7 network such as that shown at 173, although the link to the MSC 117 is shown separately for convenience. A similar SMSC server or control computer (not shown) may be provided in the visited access provider network 150 to allow that provider to offer short message service (SMS) to subscribers whose stations are assigned to home systems 151 within network 150. The SMSC 127 is a standard messaging computer used in cellular networks today to offer SMS services to cellular customers. Such SMSCs 127 will provide similar services to the newer mobile stations that also support the packet data services.

As another example, assume that the MS 105 has roamed across a PDSN boundary from network 110 to network 150 using a SIP service. Although originally assigned an address via PDSN 119, MS 105 will obtain packet data services via PDSN 159. As it roams across the boundary, the MS 105 must obtain a "care-of address" (COA) from a local "Foreign Agent" (FA), and register this COA with it's "Home Agent" (HA) on the home network. Although other control nodes or servers may perform these Agent functions, in the illustrative embodiment the PDSNs 119 and 159 serve as these Agents. The COA address allows the HA PDSN 119 to route packets with the assigned mobile IP address through the FA PDSN 159 to the visited RN 151, and hence, to the roaming MS 105.

In this example, PDSN 119, acting as the HA, will subsequently intercept all incoming traffic for the mobile station 105 and forward it to the mobile station at its new COA, that is to say via the PDSN 159. Outgoing traffic from the mobile station 105 is typically addressed as normal and routed directly from the PDSN 159 to the destination "correspondent node" (CN) from the "foreign" network. This routing path (CN=>HA=>MS=>CN) is referred to as "triangular routing". An option is for a "reverse tunnel" to be established between the FA and HA, so that all outgoing traffic from the mobile station 105 appears to originate on its home network 110. This behavior is described in RFC2002 et al., and the SIP messaging requirements for CDMA2000 are specified within the IS-835 standard.

The authentication of MIP nodes is achieved using authentication extensions to the MIP registration traffic. Three extensions are used to authenticate a mobile extension; the FA challenge extension, the mobile station to HA extension, and the mobile station to home AAA extension. A new and unique FA challenge value is passed to the mobile station from the FA PDSN 159 each time that the MS 105 registers, as a defense against a malicious mobile station hijacking a MIP session. The mobile station to HA extension is derived from a 128 bit secret key known only to the mobile station and it's HA. The mobile station to home AAA extension is derived from a 128 bit secret key known only to the MS 105 and it's home AAA server 121.

MS 105 is able to maintain a static IP address even for hand-off between radio networks connected to separate PDSN nodes, such as RNs 111 and 151 and PSDNs 119 and 159. Therefore, Mobile IP provides hand-off capability, and enables MS 105 to roam in the public IP network, rather than just within the footprint of its home access provider. Mobile IP may be important for subscribers who are served around PDSN border areas.

Architecture 100 of FIG. 1, includes a basic accounting architecture. Accounting is accomplished at the packet level, referred to as "packet accounting". Parameters used in packet accounting are divided into radio specific parameters collected by the relevant RN, e.g., RN 111, and IP network specific parameters collected by the PDSN, e.g., PDSN 119. PDSN 119 forms a usage data record (UDR) by merging the radio specific and IP network specific parameters for a given user's mobile station session. Ultimately, accounting and billing information is derived from information in the UDR. In the illustrative embodiment, PDSN 111 sends the UDR to local AAA (or RADIUS) server 121 and also maintains the UDR information until in receipt of a positive acknowledgement from AAA server 121, indicating that AAA server 121 has properly received the UDR. The PDSN 119 forms one UDR per IP address, per mobile station session.

A packet data session is an instance of continuous use of packet data service by the user. As shown by the discussion above, a packet data session begins when the user invokes packet data service. A packet data session ends when the Mobile IP user or the network terminates packet data service, wherein for a particular packet data session, the user may change locations but the same IP address is maintained. For Simple IP service, moving from the coverage area of one PDSN to another PDSN constitutes a change in packet data session because a new IP address is assigned by the new PDSN. For Simple IP service, a packet data session and a PPP session are concurrent. For Mobile IP service, a packet data session can span several PDSNs as long as the user continuously maintains mobility bindings at its HA and there is no lapse in Mobile IP registrations/re-registrations (i.e., the IP address is persistent). For Mobile IP service, the packet data session can exist through several changes of the PPP session.

A PPP session describes the time during which a particular PPP connection instance is maintained in the open state in both the mobile station and the serving PDSN. The PPP session is maintained during periods when the mobile station is dormant (i.e., no activity). If a user hands off from one radio network to another radio network but is still connected to the same PDSN, the PPP session remains. If a user changes PDSN, a new PPP session is created at the new PDSN.

Figure 2:
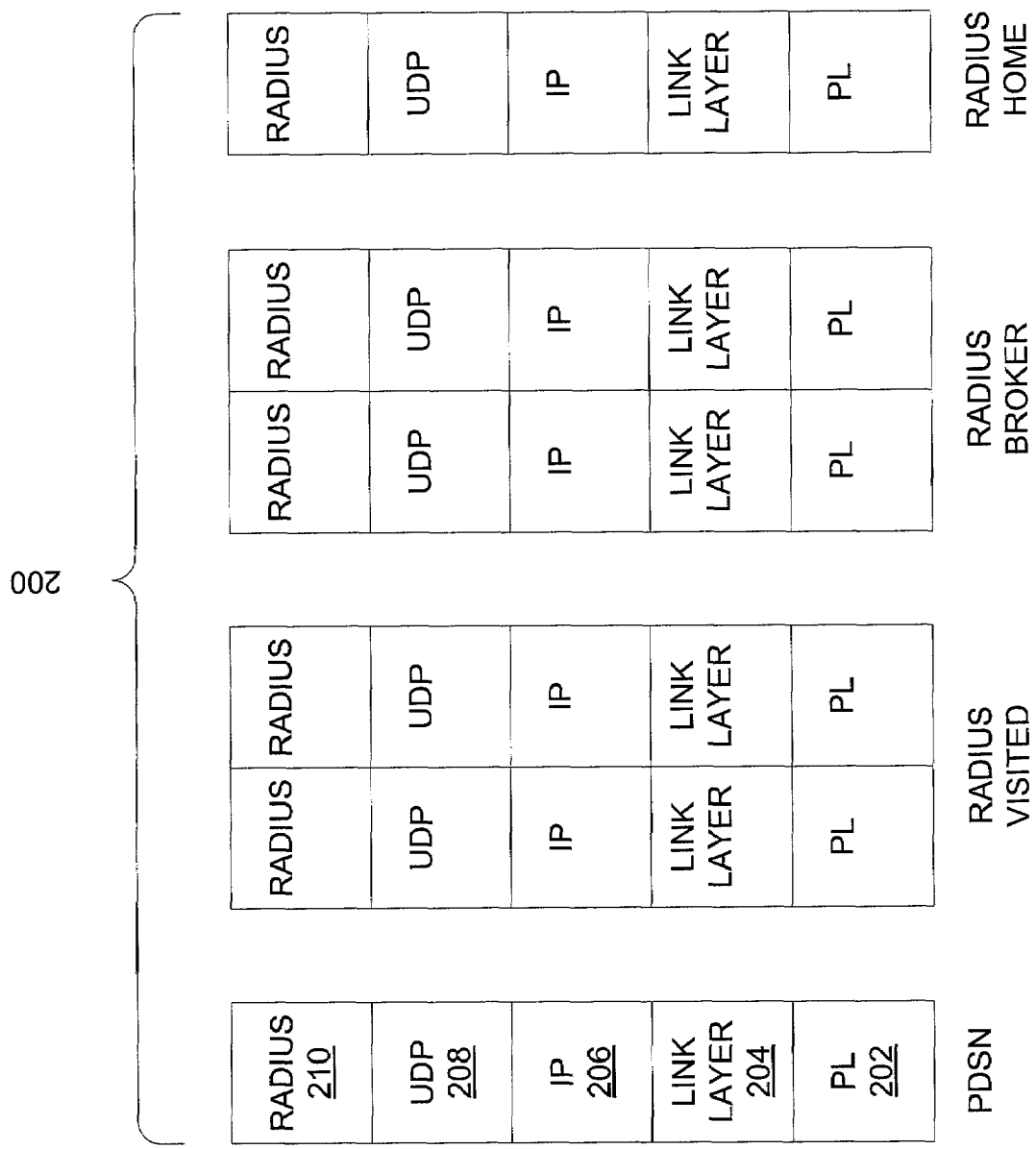
FIG. 2 is a diagram of a RADIUS protocol reference model.

FIG. 2 shows a RADIUS protocol reference model 200 for the RADIUS and PSDN servers of FIG. 1. Each server (or subsystem) implements a standard multi-layer protocol comprising a physical layer (PL) 202, link layer 204, IP layer 206, user datagram protocol (UDP) layer 208 and a RADIUS protocol layer 210. The RADIUS protocol 210 conforms to the IS-835 Standard and may also be referred to as the 3GPP2 protocol. The 3GPP2 protocol includes fields that accommodate accounting and, therefore, billing of services used by a mobile station.

FIG. 3A through FIG. 3C show the parameter and value definitions of a 3GPP2 protocol modified to implement the improved billing functionality. Within the protocol, a variety of groups of identifiers are defined, wherein each group comprises a set of parameters. For example, a group "A" Mobile Identifiers 302 includes a mobile station ID (MSID). Each mobile station is given a unique ID which is stored in the MSID field during a session. Other groups include "B" User Identifiers 304, "C" Session Identifiers 306, "D" Infrastructure Identifiers 308, "E" Zone Identifiers 310, "F" Session Status 312, "G" Session Activity 314, "I" Quality of Service 316, "Y" Airlink Record Specification Parameters 318, and "Z" Container 320.

Group F includes a parameter F13 called "Release Indicator". This parameter is used for storing an integer value corresponding to a reason for a "stop record". A stop record is a record that indicates termination of a session and is used in accounting. The presently defined integer values for parameter F13 consist of 0=>unknown, 1=>PPP/Service timeout, 2=>handoff, 3=>PPP termination, and 4=>mobile IP registration failure. The value 0 corresponds to cases where a session was terminated or failed to be established for an undefined reason. The value 1 corresponds to a timeout related to the expiration of the inactivity timer. Value 2 corresponds to a handoff from one PDSN to another PDSN for a roaming mobile station. Value 3 corresponds to a PPP session termination by the mobile station. Finally, value 4 corresponds to a failure of the mobile station to register (i.e., the PPP session was not initiated).

To allow a PDSN to more accurately account for and bill a mobile station when a first session is terminated and a second session is initiated prior to expiration of a typical inactivity timer, the 3GPP2 protocol is modified. A first modification includes defining a new parameter value for parameter F13. As an example, the value 5 (or F13=5) may be defined to indicate "billing adjustment needed". Therefore, when F13=5, the corresponding AAA server calculates the appropriate adjustment. However, presently, the 3GPP2 protocol does not include a parameter and/or value which allows the AAA server to more accurately calculate such an adjustment, without simply subtracting the value of the inactivity timer.

Additionally, in the preferred form, a timer-triggered interim UDR (every 10 minutes, for example) is maintained and a new attribute G17 (last user activity time) is added in PDSN Accounting Stop UDR record. An interim accounting record (or interim UDR) is maintained, which contains the attributes found in the Accounting Stop UDR, except for the Acct-Term-Cause attribute. The values of the attribute in the interim accounting record are cumulative since the Accounting-Request Start record. The attribute G17 is present in interim UDRs and STOP UDRs, and preferably has a specification similar to that of G4. For instance, G17 could have a specification of: Type=26, Vendor Type=(80 at present, could be G17 if and when 3GPP2 assigned it), 3GPP2 Vendor ID=5535, Payload Length=4, Format=time (to be implemented same as G4), Field=3GPP2_Last_Activity_Timestamp. If there is no user activity during the session, set G17=G4 (Start Record): and each distinct PPP session will have its own unique Accounting_Session_ID and Correlation_ID, designated by C1 and C2, respectively. Note that this attribute can be used in an interim UDR as the STOP UDR, should the real STOP UDR not be received by the PDSN.

Figure 4:
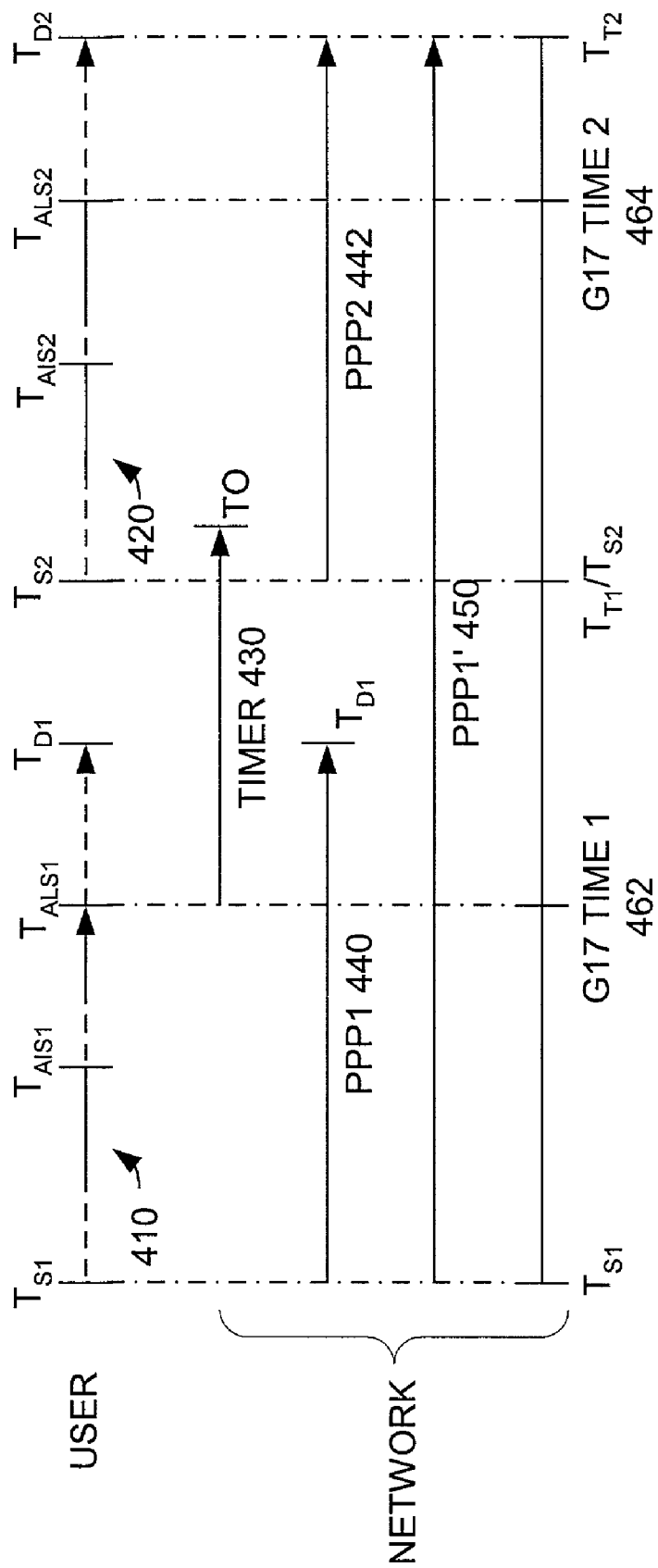
FIG. 4 is a diagram of various user and network timelines from use of the system of FIG. 1.

Referring to FIG. 4, a scenario in accordance with an embodiment is described. This scenario may be implemented on the network 100 of FIG. 1, or any similar digital network, wherein the RADIUS and/or PDSN servers are configured to appropriately process a protocol, such as the illustrative modified 3GPP2 protocol. In FIG. 4 the user's mobile station view is represented by timelines 410 and 420. FIG. 4 also shows the network view, comprised variously of the other timelines, as discussed below. According to the scenario, a user operating a mobile station, e.g., MS 103 or MS 105, starts a PPP session (call it PPP1) at time $T_{s1}$, as is shown in timeline 410 of FIG. 4. Assume an initial mobile station activity has a stop time of $T_{ais1}$ and a last mobile station data activity stop time of $T_{als1}$. The MS disconnects at a time $T_{d1}$ (e.g., hangs up a cellular packet service call).

The network activity timer is shown with timeline 430. The inactivity timer begins to count at $T_{als1}$ and is set to expire at a time TO. Assume that before TO, the user initiates another connection request on the same PDSN at a time $T_{s2}$, shown as timeline 420. From the user's perspective, the start of the new session is similar to the start of a new call. Also assume an initial mobile station activity stop time of $T_{ais2}$ and a last mobile station data activity stop time of $T_{als2}$ for the second session. Assume the user disconnects at a time $T_{d2}$.

Presently, two things could happen to the new request for connection at $T_{s2}$. In a first outcome, a new PPP session (i.e., a PPP2 442) is given to the user at $T_{s2}$ and the prior PPP session (i.e., PPP1 440) is disconnected. In a second outcome, the old PPP session (i.e., PPP1) is maintained after $T_{s2}$ and assigned to the user for the subsequent connection. In this latter case, the connections are "bridged" into a single PPP session and the PPP session (i.e., PPP1' 450) is terminated when the user disconnects from the second connection at $T_{d2}$. Bridging in this manner gives rise to inaccurate billing, as previously mentioned. For accounting purposes, the network side (e.g., a PDSN) in the bridging scenario is not aware of the termination at $T_{d1}$.

In accordance with the embodiment, and to prevent such billing inaccuracies, PPP processing is separated from billing. Even if a bridged PPP session occurs for two separate connections and the same IP address is used for each connection, such a bridged session will be treated as two separate connections from billing perspective. That is, regardless of how a PDSN treats PPP sessions (i.e., disconnect or bridge), the same accounting records are generated. Consequently, if the PPP session is bridged, an accounting stop record is generated for time $T_{als1}$ followed by an accounting start record at $T_{s2}$ with a different accounting session ID. The G17 parameter of the modified 3GPP2 protocol allows storage of the accounting stop record, thereby securing a more accurate record of termination of the first connection. With the G17 parameter of the modified 3GPP2 protocol, the PDSN can determine whether a PPP session is the result of a new PPP request or a continuation of an existing PPP session.

In a typical digital data environment, information and requests are sent by a packet control function (PCF) hosted on a device (e.g., a mobile station). If the second PPP request comes in from a different (PCF), the PDSN will know this is a new call by the absence of old PCF information. For inter-PCF, intra-PDSN handoff, the old PCF information is sent over the R-P connection setup request message per IOS standard. If the second PPP request comes in from the same PCF, no R-P connection request is necessary since an R-P connection already exists. However, the PDSN will know that this is a new call as a PPP setup procedure is initiated by the MS, which indicates that the MS does not have a PPP session. As a result, regardless of whether the PDSN bridges the PPP session or not, the PDSN will know that it is a new PPP connection request.

For the above example of FIG. 4, assume disconnect at time Td1 is not recognized by the network. Even so, a proper adjustment can be determined such that the user is only billed for connection time, independent of whether or not the PPP1 and PPP2 were bridged into PPP1'. With attention to bottom timeline in the drawing, the network recognizes the first session start time at Ts1. Since disconnect at time Td1 is not recognized by the network, the network assumes PPP1 session stop time is TT1, rather than Td1. TT1 is also coincident with the start of the next connection, i.e., at Ts2, which occurs prior to expiration on timer 430 in this example. G17 TIME 1 462 is the time of the last activity, which is recorded in accordance with the modified 3GPP2 protocol. The time of the last activity is also recorded in new parameter G17, as G17 TIME 2 464. The disconnect time at Td2 of the second session is recognized by the network as TT2.

Under prior approaches, the billing time for PPP1 is inaccurately given by:

(Inaccurate)PPP1 Billing time=$T_{T1}-T_{s1}$

However, with the present techniques, an improved adjustment can be calculated for the time between connections, i.e., the time between $T_{d1}$ and $T_{s2}$. In the preferred form this is accomplished by terminating the prior PPP session (e.g., PPP1) at the last activity stop time of the prior PPP session (e.g., $T_{ALS1}$) and starting a new PPP session for the next PPP session. This typically provides a small advantage to the user, since the user does not, in this embodiment get billed for the time between the last activity and the time of disconnect by the user's device. In accordance with the present invention, billing time corresponding to PPP1 is given by:

PPP1 Billing Time=$G17_1-T_{s1}$

In the case of determining a billing time corresponding to PPP2, a billing adjustment time (BAT) is determined using the following equation:

BAT=$T_{s2}-G17_1$

If the BAT is less than the inactivity time (e.g., 10 minutes), regardless of whether the session was bridged the billing time corresponding to PPP2 is given by:

PPP2 Billing Time=$T_{t2}-T_{s2}$.

If BAT is greater than the inactivity timer, then the start and stop times of the sessions PPP1 and PPP2 would have been recognized by the network and not bridged, so the G17 times would not be used. G17 TIME 2 is not needed for determining the billing time in the present example. However, a subsequent session (e.g., PPP3) was bridged with PPP2, the G17 time 2 would be required.

As previously mentioned, preferably a new value for parameter F13 is defined which advises the accounting server (e.g., a RADIUS or PDSN server) of the need to perform the above billing adjustment analysis. The corresponding downstream processing for billing adjustment using parameter F13 may be appreciated using the following logic:

If F13=3 (i.e., PPP termination initiated by client), then

Billable Session Time=$G4$(Stop Record)-$G4$(Start Record)

Else F13=0, 1, or 5 (i.e., unknown, PPP/Service timeout, or billing adjustment needed)

Billable Session Time=$G17$(Stop Record)-$G4$(Start Record)

Other values of F13 are not treated in downstream processing. For F13=2 (i.e., handoff) the downstream processing system will not see the F13 value because the accounting (e.g., RADIUS) Server will not pass this stop UDR. For F13=4 (i.e., Mobile IP registration failure), the downstream processing system will not see the F13 value unless Mobile IP is implemented.

As shown by the discussion above, certain elements of the embodiments entail execution of applications, the AAA, the RADIUS, and the billing adjustment, on a server or the like. The hardware of such a computer typically is general purpose in nature, albeit with an appropriate network connection for communication via an IP network or an SS7 network or the like.

As known in the data processing and communications arts, each such general-purpose computer (including servers) typically comprises a central processor, an internal communication bus, various types of memory (RAM, ROM, EEPROM, cache memory, etc.), disk drives or other code and data storage systems, and one or more network interface cards or ports for communication purposes. Such computers may also be coupled to or include a display and one or more user input devices (not shown) such as alphanumeric and other keys of a keyboard, a mouse, a trackball, touch screens, microphones, and so on. The display and user input element(s) together form a user interface for interactive control of the operation of the computer system. The user interface elements may be locally coupled to the computer system, for example in a workstation configuration, or the user interface elements may be remote from the computer and communicate therewith via a network. The elements of such a general purpose computer system also may be combined with or built into routing elements or nodes of the network, such as the PDSN the SMSC, the BSC or the MSC.

The functionalities referred to as "applications," such as an accounting (or AAA) application, involve software including executable code as well as associated stored data. The software code is executable by the general-purpose computer that functions as the particular server, e.g. 121 or 141. In operation, the code and possibly the associated data records are stored within the general-purpose computer system. At other times, however, the software may be stored at other locations and or transported for loading into the appropriate general-purpose computer system, or it may be dynamically provided. Hence, the embodiments involve one or more software products in the form of at least one machine-readable medium and one or more modules of code carried by the medium that are executable by a processor to cause the processor to implement the relevant application(s) in essentially the manner performed in the embodiments discussed and illustrated herein.

A machine-readable medium, as used herein, may be any physical element or carrier wave, which can bear instructions or code for performing a sequence of steps in a machine-readable form or bear associated data. Examples of physical forms of such media include floppy disks, flexible disks, hard disks, magnetic tape, any other magnetic medium, a CD-ROM, DVD, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the data or the instructions or code for performing the sequence of steps. Such a carrier wave may be received via a wireline or fiber-optic network, via a modem, or as a radio-frequency or infrared signal, or any other type of signal which a computer or the like may receive and decode.

Those skilled in the art will recognize that the techniques outlined above have a broad range of applications, and the embodiments admit of a wide range of modifications, without departure from the inventive concepts. For example, the illustrated embodiments show a particular breakdown of the AAA, agent (FA and HA) and DHCP functions. While these arrangements are presently preferred, those skilled in the art will recognize that different organizations are possible within the broader inventive concepts of these embodiments. In various embodiments, the AAA and DHCP functions could run as separate applications, for example, with the AAA for packet services implemented in the HA PDSN and/or the FA PDSN. As another example, the techniques described above may be implemented on other networks where it is desirable to bill for packet services at the packet session level, such as a wired network utilizing PPP over Ethernet type sessions.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim any and all modifications and variations that fall within the true scope of the inventive concepts.

APPENDIX

Acronym List

| | |
|---|---|
| 1x | cdma2000-1x |
| 1xRTT | Radio Transmission Technology - in 1.25 MHz CDMA band |
| 3G | Third Generation of Wireless Telephony |
| AAA | Authentication, Authorization, and Accounting |
| BSC | Base Station Controller |
| BTS | Base Transceiver System |
| CDMA | Code Division Multiple Access |
| CN | Correspondent Node |

APPENDIX-continued

Acronym List

| | |
|---|---|
| COA | Care-of Address |
| DNS | Domain Naming System |
| DDNS | Dynamic Domain Naming System |
| DHCP | Dynamic Handshake Challenge Protocol |
| FA | Foreign Agent |
| GSM | Global System for Mobile communications |
| GPRS | General Packet Radio Service |
| HA | Home Agent |
| HLR | Home Location Register |
| IRM | International Roaming MIN |
| IP | Internet Protocol |
| ISP | Internet Service Provider |
| MIN | Mobile Identification Number |
| MIP | Mobile IP |
| MS | Mobile Station |
| MSID | Mobile Station ID |
| NAI | Network Access Identifier |
| PCF | Packet Control Function |
| PDSN | Packet Data Serving Node |
| PPP | Point-to-Point Protocol |
| PDA | Portable Digital Assistant |
| PI | Push Initiator |
| RADIUS | Remote Authentication Dial In User Service |
| RAN | Radio Access Network |
| RN | Radio Network |
| R-P | Radio-Packet |
| SMS | Short Message Service |
| SMSC | Short Message Service Center |
| SS7 | Signaling System 7 |
| SIP | Simple IP |
| TCP | Transmission Control Protocol |
| UDP | User Datagram Protocol |
| UDR | User Data Record |
| UMTS | Universal Mobile Telecommunications Systems |
| VLR | Visitor Location Register |

What is claimed is:

1. A method of providing information for use in determining duration of packet data communication through a packet network for a wireless communication device, for use in billing for service to the wireless communication device, comprising:

during a first packet data communication session through the packet network for the wireless communication device, detecting inactivity with regard to packet data communication via the first session;

in response to the detection of inactivity, (1) noting the time of inactivity detection as a last activity time, and (2) starting an inactivity timer having a predetermined time-out period such that the timer will time out if the predetermined period expires before detection of further activity with regard to packet data communication via the first session;

subsequently, receiving a request from the wireless communication device for establishment of a second packet data communication session through the packet network; and if the request for establishment of the second session is received before the predetermined period of inactivity expires, (a) providing a billing adjustment flag signifying a need to adjust duration computation for the first session, and (b) providing the noted last activity time for use in the adjustment of the duration computation.

2. The method of claim 1, wherein the billing adjustment flag and the noted last activity time for use in the adjustment of the duration computation are provided in a usage data record (UDR).

3. The method of claim 2, wherein:
the UDR is compiled in a packet data serving node (PDSN); and
the method further comprises transmitting the UDR from the PDSN to a Authentication, Authorization and Accounting (AAA) server.

4. The method of claim 3, wherein:
the UDR conforms to a 3GPP2 protocol; and
a "G" Session Activity field of the UDR contains a timestamp for the noted last activity time.

5. The method of claim 4, wherein the timestamp for the noted last activity time is contained in a G17 field of the UDR.

6. The method of claim 1, wherein each session comprises a point-to-point protocol (PPP) session between the wireless communication device and a packet data serving node (PDSN) in the network.

7. The method of claim 1, wherein the packet network includes one or more wireless communication links for communications with the wireless communication device.

8. The method of claim 1, wherein the wireless communication device is a device chosen from a group consisting of: a mobile telephone; a wireless e-mail device; a wireless web enabled device; a wireless Internet enabled device; a personal digital assistant; and a pager.

9. The method of claim 1, further comprising, in response to the billing adjustment flag, computing duration for the first session from a start time up until the noted last activity time.

10. A packet data serving node for use in a communication network providing wireless packet data communication service to a wireless communication device, wherein the packet data serving node is configured to perform functions comprising:
during a first packet data communication session through the network for the wireless communication device, detecting inactivity with regard to packet data communication via the first session;
in response to the detection of inactivity, (1) noting the time of inactivity detection as a last activity time, and (2) starting an inactivity timer having a predetermined time-out period such that the timer will time out if the predetermined period expires before detection of further activity with regard to packet data communication via the first session;
subsequently, receiving a request from the wireless communication device for establishment of a second packet data communication session through the packet network;
if the request for establishment of the second session is received before the predetermined period of inactivity expires, (a) providing a billing adjustment flag signifying a need to adjust duration computation for the first session in a usage data record (UDR) for communications of the wireless communication device through the network, and (b) providing the noted last activity time in the UDR for use in the adjustment of the duration computation; and
forwarding the UDR to a Authentication, Authorization and Accounting (AAA) server.

11. The packet data serving node of claim 10, wherein:
the UDR conforms to a 3GPP2 protocol; and
a "G" Session Activity field of the UDR contains a timestamp for the noted last activity time.

12. The packet data serving node of claim 11, wherein the timestamp for the noted last activity time is contained in a G17 field of the UDR.

13. The packet data serving node of claim 10, wherein each session comprises a point-to-point protocol (PPP) session between the wireless communication device and the data serving node.

14. A communication network providing wireless packet data communication service to a wireless communication device, the communication network comprising:
a packet data serving node (PDSN) is configured to perform functions comprising:
(a) during a first packet data communication session through the network for the wireless communication device, detecting inactivity with regard to packet data communication via the first session;
(b) in response to the detection of inactivity, (1) noting the time of inactivity detection as a last activity time, and (2) starting an inactivity timer having a predetermined time-out period such that the timer will time out if the predetermined period expires before detection of further activity with regard to packet data communication via the first session;
(c) subsequently, receiving a request from the wireless communication device for establishment of a second packet data communication session through the packet network; and
(d) if the request for establishment of the second session is received before the predetermined period of inactivity expires, (i) providing a billing adjustment flag signifying a need to adjust duration computation for the first session in a usage data record (UDR) for communications of the wireless communication device through the network, and (ii) providing the noted last activity time in the UDR; and
a Authentication, Authorization and Accounting (AAA) server for receiving the UDR from the PDSN, for computing duration for the first session from a start time up until the noted last activity time, in response to the billing adjustment flag.

15. The communication network of claim 14, wherein:
the UDR conforms to a 3GPP2 protocol; and
a "G" Session Activity field of the UDR contains a timestamp for the noted last activity time.

16. The communication network of claim 15, wherein the timestamp for the noted last activity time is contained in a G17 field of the UDR.

17. The communication network of claim 15, wherein each session comprises a point-to-point protocol (PPP) session between the wireless communication device and the PDSN.

* * * * *